(12) United States Patent
Johnson et al.

(10) Patent No.: US 7,330,550 B1
(45) Date of Patent: Feb. 12, 2008

(54) CRYPTOGRAPHIC SYSTEM AND METHOD THAT USES EXCITATION SPECTROSCOPY

(75) Inventors: Shikik T. Johnson, State College, PA (US); Stephen D. Russell, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 845 days.

(21) Appl. No.: 10/371,544

(22) Filed: Feb. 19, 2003

(51) Int. Cl.
- H04K 1/00 (2006.01)
- H04N 7/167 (2006.01)
- H04L 9/00 (2006.01)
- H04B 10/00 (2006.01)
- H04L 9/12 (2006.01)
- G09C 5/00 (2006.01)
- G06K 9/00 (2006.01)
- G06K 9/76 (2006.01)

(52) U.S. Cl. ............... 380/256; 380/229; 380/263
(58) Field of Classification Search ........... 380/256, 380/229, 263
See application file for complete search history.

(56) References Cited

U.S. PATENT DOCUMENTS 5,715,316 A  2/1998  Steenblik et al.
5,793,871 A * 8/1998  Jackson ............... 380/256
6,190,933 B1  2/2001  Shimabukuro et al.
6,392,788 B1  5/2002  Yoon et al.
2004/0101168 A1* 5/2004  Kostrzewski et al. ....... 382/115

FOREIGN PATENT DOCUMENTS

JP        2006303927 A  * 11/2006

OTHER PUBLICATIONS

Wendy Plesniak, Michael Halle, "Spatial Displays and Computer Graphics: Computed Holograms and Holographic video displays of 3D data", Jul. 2005, ACM SiGGRAPH 2005 Course, SiGGRAPH 05', pp. 69-103.*
English Translation for JP 2006-303927A [Oct. 11, 2007].*

* cited by examiner

Primary Examiner—Gilberto Barrón, Jr.
Assistant Examiner—Courtney D. Fields
(74) Attorney, Agent, or Firm—Peter A. Lipovsky; J. Eric Anderson; Ryan J. Friedl (57) ABSTRACT

A cryptographic system includes: a) a light source for generating an excitation light signal; b) a spatial light modulator for encoding the excitation light signal with data; c) a wavelength dispersive element for transforming the excitation light signal into a spectral encoded light signal characterized by relative peak intensities at specific wavelengths; d) an optical detector for generating an information output signal in response to receiving an optical input signal, wherein the information output signal represents spectral and intensity characteristics of the optical input signal; and e) a processor for validating the information output signal if differences between representations of the optical input signal, and representations of the spectral encoded light signal are within predetermined limits.

20 Claims, 9 Drawing Sheets

CRYPTOGRAPHIC SYSTEM AND METHOD THAT USES EXCITATION SPECTROSCOPY

BACKGROUND OF THE INVENTION

Encryption and decryption methods are used to control the access to information being transmitted from one point to another or to authenticate such information. However, such methods typically require sophisticated algorithms and significant numerical processing. A need exists for computationally simple, yet secure methods and/or system for encrypting and decrypting information.

SUMMARY OF THE INVENTION

A cryptographic system includes: a) a light source for generating an excitation light signal; b) a spatial light modulator for encoding the excitation light signal with data; c) a wavelength dispersive element for transforming the excitation light signal into a spectral encoded light signal characterized by relative peak intensities at specific wavelengths; d) an optical detector for generating an information output signal in response to receiving an optical input signal, wherein the information output signal represents spectral and intensity characteristics of the optical input signal; and e) a processor for validating the information output signal if differences between representations of the optical input signal, and representations of the spectral encoded light signal are within predetermined limits.

BRIEF DESCRIPTION OF THE DRAWINGS

Throughout the several views, like elements are referenced using like references.

DESCRIPTION OF THE PREFERRED EMBODIMENT

Figure 1:
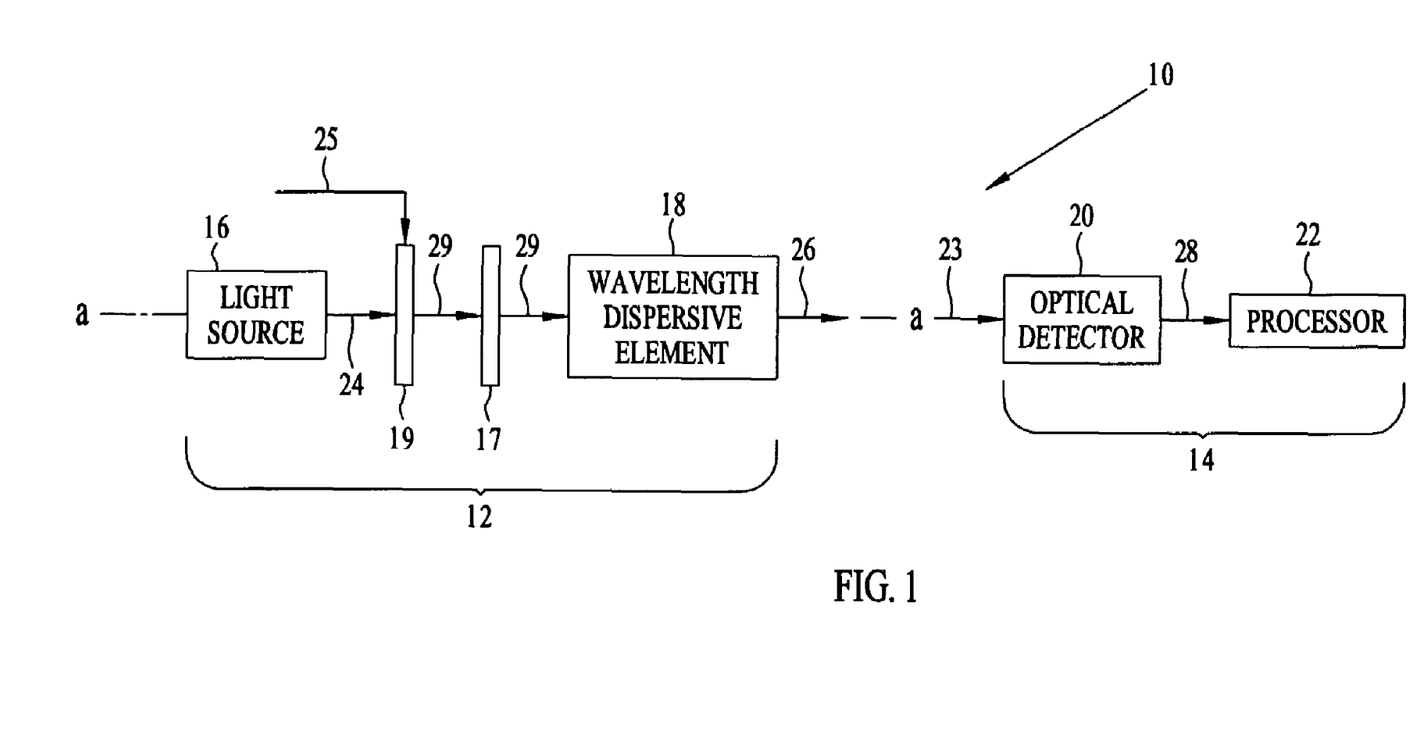
FIG. 1 shows an embodiment of a cryptographic system.

Referring to FIG. 1, the present invention is directed to a cryptographic system 10 that includes an optical encoder system 12 and an optical decoder system 14. Optical encoder system 12 includes a light source 16 for generating an excitation light signal 24, an optical encoder 19, and a wavelength dispersive element 18. Optical encoder 19, such as a spatial light modulator or light valve, modulates the intensity or temporal (phase) characteristics of the excitation light signal 24 with data under the supervision of control signal 25 to create encoded light signal 29. Wavelength dispersive element 18 transforms the encoded light signal 29 into a spectral encoded light signal 26 characterized by a unique set of relative peak intensities at specific wavelengths. An example of a light valve suitable for use in conjunction with an embodiment of cryptographic system 10 is described in U.S. Pat. No. 6,190,933 by Shimabukuru et al. entitled *Ultra-High Resolution Liquid Crystal Display On Silicon-On-Sapphire* (20 Feb. 2001). By way of example, excitation light signal 24 may be a broadband light signal having wavelengths in the range of about 250 to 1550 nm, and be either coherent or non-coherent. In one embodiment, light source 16 may be a coherent light source, such as a laser diode, for generating a coherent excitation light signal 24 having a wavelength of about 800 nm.

Figure 2:
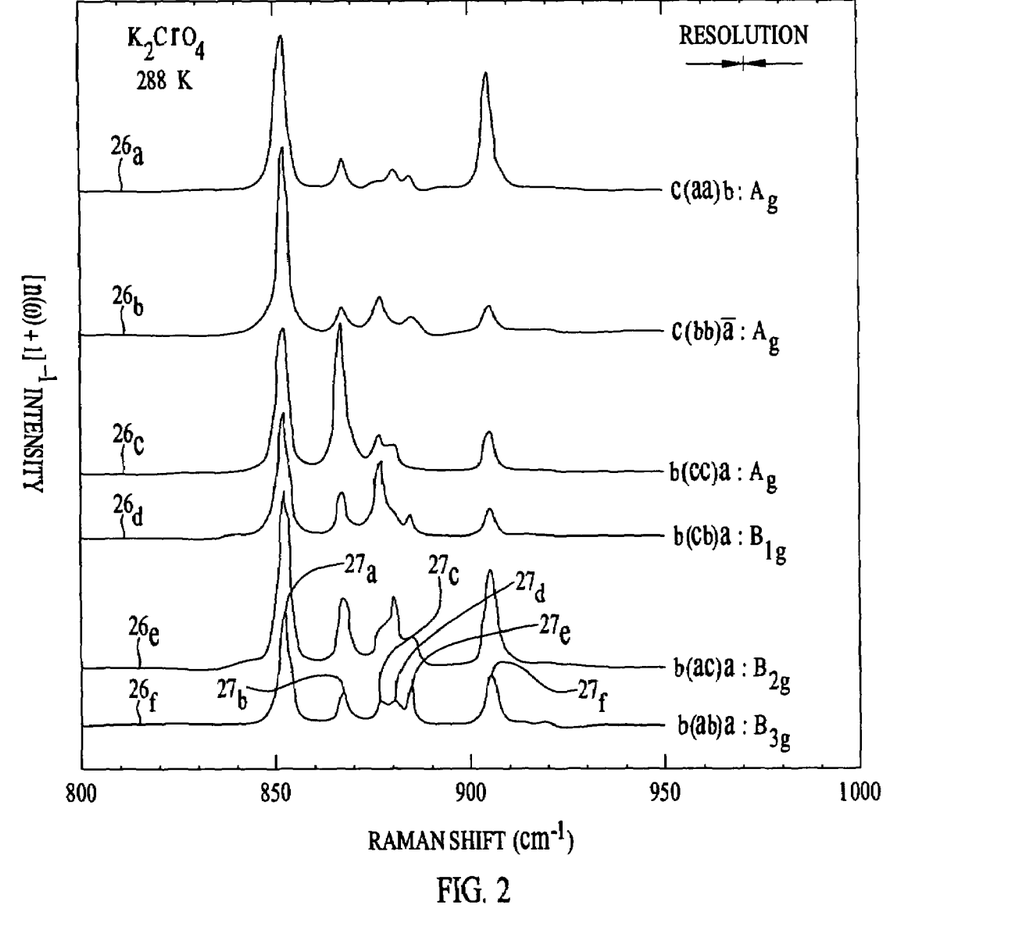
FIG. 2 shows the exemplary spectral and intensity characteristics of spectral encoded signals having different polarizations.
Figure 3:
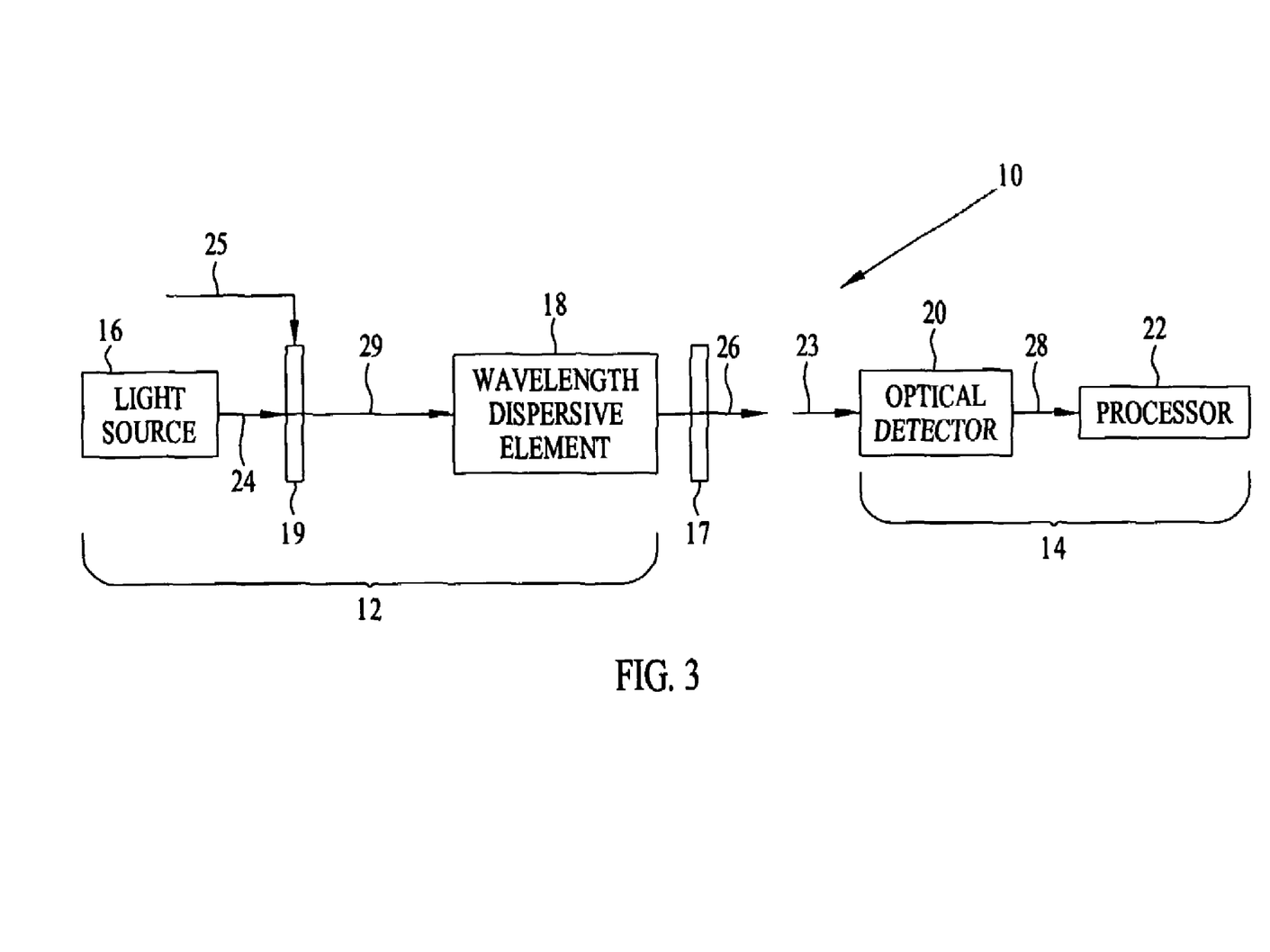
FIG. 3 shows another embodiment of a cryptographic system.
Figure 8:
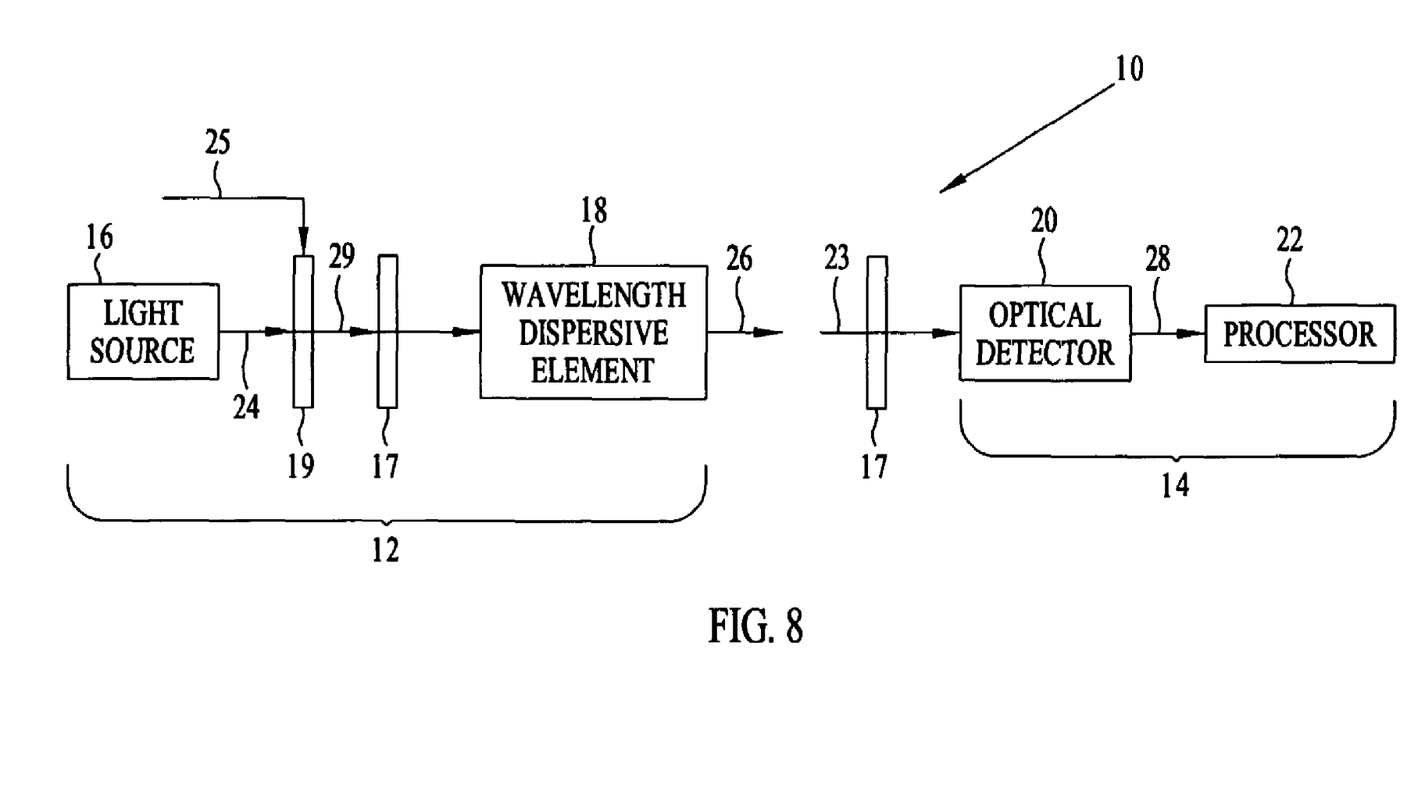
FIG. 8 shows an embodiment of a cryptographic system that includes polarizers in both the optical encoder and decoder systems.

Examples of spectral encoded light signals 26 are shown in FIG. 2 and include spectral encoded light signals 26*a*, 26*b*, 26*c*, 26*d*, and 26*e* that in one embodiment may result, for example, from an encoded light signal 29 propagating through a wavelength dispersive element 18 such as a potassium chromate crystal at 296 K. Each of spectral encoded light signals 26 26*a*, 26*b*, 26*c*, 26*d*, and 26*e* may have a unique polarization. As shown in FIG. 1, such polarization may be imposed on spectral encoded light signals 29 or 24 by an optional polarizer 17 that may be interposed in the optical path along optical axis a-a to interact with encoded light signal 29 or excitation light signal 24 for imbuing spectral encoded light signal 26 with polarization characteristics. Alternatively, such polarization may be imbued directly on spectral encoded light signals 26 by directing spectral encoded light signals 26 through polarizer 17, as shown in FIG. 3. In another embodiment, as shown in FIG. 8, cryptographic system 10 may include a polarizer 17 in both optical encoder system 12 for polarizing encoded light signal 26, and in optical decoder system 14 for polarizing received optical signal 23.

Still referring to FIG. 1, optical decoder system 14 includes an optical detector 20 and a processor 22. Optical detector 20 generates an information output signal 28 in response to receiving an optical input signal 23, which may or may not be spectral encoded light signal 26. One of the functions of processor 22 is to determine if optical signal 23 is a valid signal. Optical signal 23 is a valid signal if the differences between representations of the intensities and wavelength characteristics of optical signals 23 and 26 are within predetermined limits. Information output signal 28 represents the spectral and intensity characteristics of the optical input signal 23. Processor 22 categorizes, and thereby validates the information output signal 28 as a valid signal if the differences between the spectral and intensity characteristics of optical input signal 23, as represented by information optical signal 28, and representations of the relative peak intensities at specific wavelengths of the spectral encoded light signal 26 that are stored in processor 22 are within the aforementioned predetermined limits. If however, differences between the representations of intensities at specific wavelengths (i.e., spectral components) of signals 23 and 26 are not within the predetermined limits, then processor 22 categorizes optical signal 23 as being a non-valid signal. Thus, processor 22 discriminates between valid and non-valid optical signals that are detected by optical detector 20 by applying, for example, numerical techniques to representations of light signals 23 and 26.

The processor 22 may distinguish between a valid and non-valid signal using a variety of techniques, for example, by comparing the number of spectral peaks, by comparing the location of each of the spectral peaks, and/or by comparing the ratio of intensities between spectral peaks. In the latter case, a spectral encoding parameter can be defined as a measure of the relative ratio of intensities of each of the spectral peaks. If $I_{max}(\lambda_0)$ represents the spectral line of an optical signal, such as optical signal 26 or 23, with maximum intensity at a particular wavelength $\lambda_0$, and $I(\lambda_i)$ represents the intensity of each of the other spectral lines positioned at wavelength $\lambda_i$, then a spectral encoding parameter $\Gamma$ is defined as follows:

$$\Gamma \equiv \sum_{i=1}^{n} \frac{I_{max}(\lambda_0) - I(\lambda_i)}{I_{max}(\lambda_0)}$$

where i is an integer counting index, and n represents the number of peaks in a spectrum. For example, in FIG. 2, line 26f is characterized by 6 peaks 27a, 27b, 27c, 27d, 27e, and 27f. The processor 22 then may compare numerical representations of the spectral encoding parameter $\Gamma$ of the received signal 23 as represented by signal 28 with the transmitted signal 26 according to $/\Gamma_R$-$\Gamma_T/ \leq \delta$ where $\Gamma_R$ is the spectral encoding parameter of the received signal 23 as represented by signal 28, $\Gamma_T$ represents the spectral encoding parameter of the transmitted signal 26, and $\delta$ is the experimental uncertainty within which validation is acceptable.

By way of example, wavelength dispersive element 18 may be implemented as a mono-crystalline material, polycrystalline material, amorphous solid, liquid or gaseous composition, which impose specific spectral characteristics on encoded light signal 29 to create spectral encoded light signal 26. Such spectral characteristics are believed to result from the effects of vibrational, rotational, librational lattice vibrations, or from collective excitations of electrons (e.g. plasmons), magnetic spins (e.g. magnons), polarization (e.g. polaritons), or the like of the material that comprises wavelength dispersive element 18 as that material interacts with the encoded light signal 29. In one embodiment, wavelength dispersive element 18 may be implemented of a material selected from the group that includes semiconductors (e.g. AlGaAs, SiGe), insulators (e.g. potassium chromate, antimony trioxide, strontiumchromogallate), and metals (e.g. molybdenum).

Figure 4:
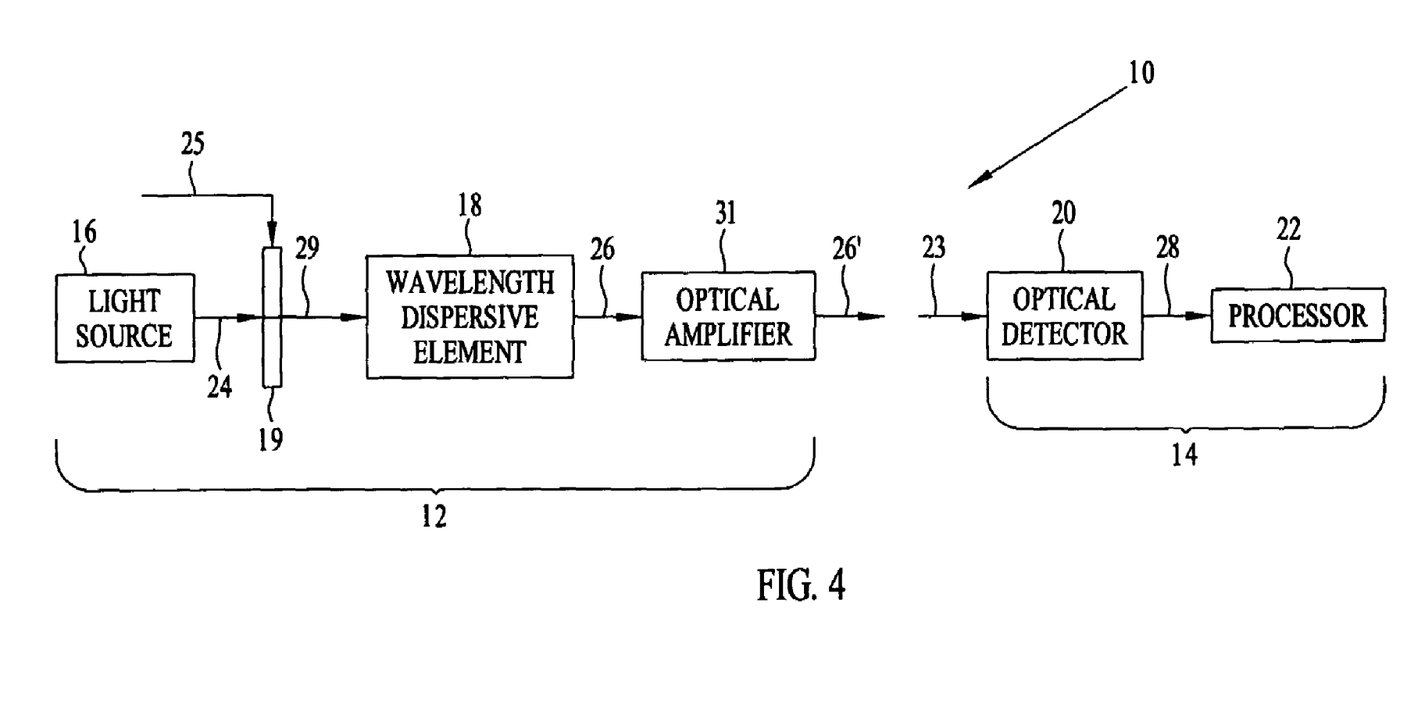
FIG. 4 is an embodiment of a cryptographic system that includes an optical amplifier.

As shown in FIG. 4, optical encoder system 12 may further include an optical amplifier 31 for amplifying and transforming the spectral encoded light signal 16 into an amplified spectral encoded light signal 26'. Light source 16 generates an excitation light signal 24 that is encoded with data by spatial light modulator 19 under the supervision of signal 25 to create encoded light signal 29. In one embodiment, optical amplifier 31 may be implemented as an erbium-doped optical amplifier such as described in U.S. Pat. No. 6,392,788 by Yoon et al. entitled "Optical Fiber Amplifier" (21 May 2002).

Figure 5:
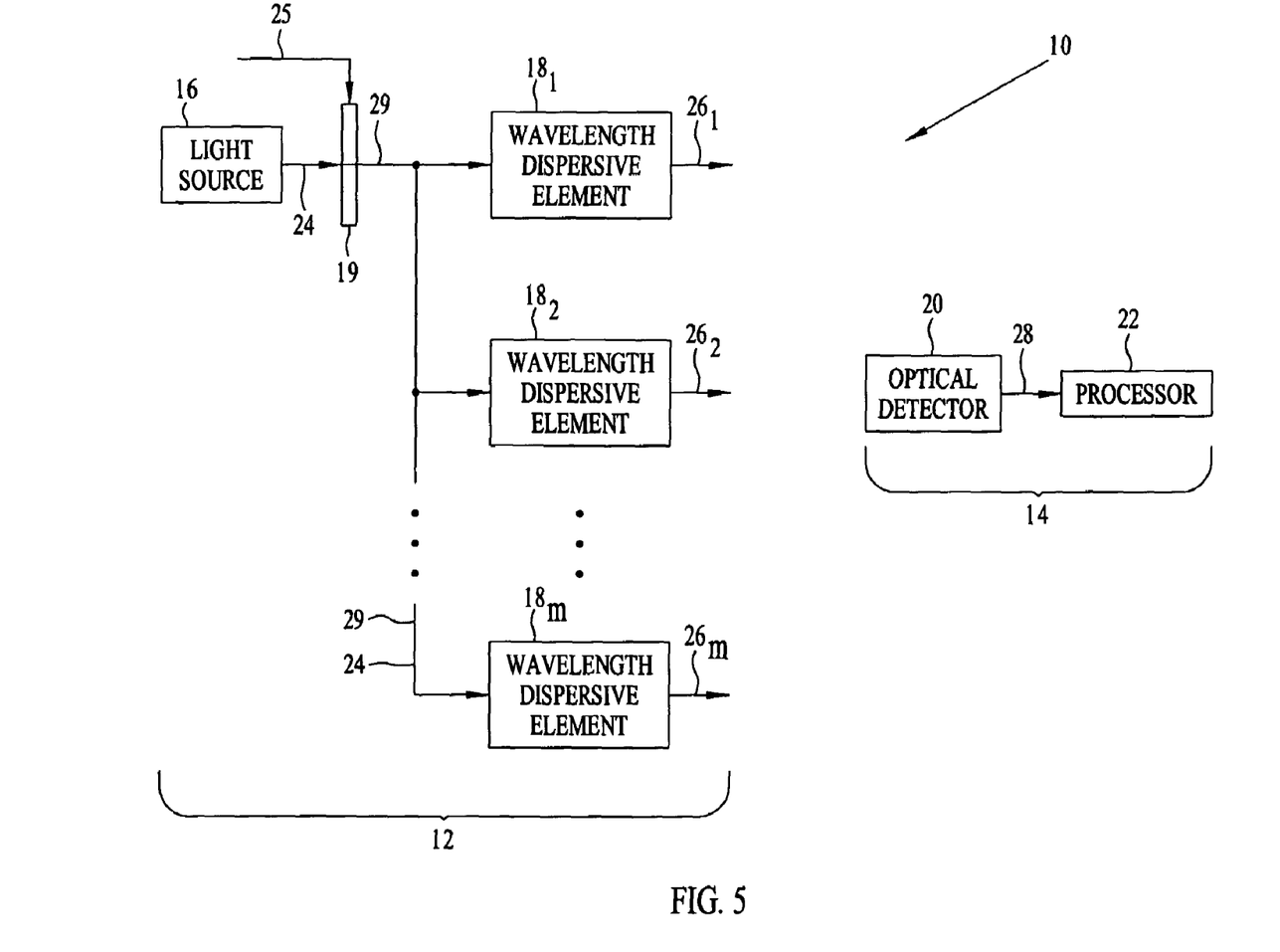
FIG. 5 shows an embodiment of a cryptographic system that includes multiple wavelength dispersive elements.
Figure 6:
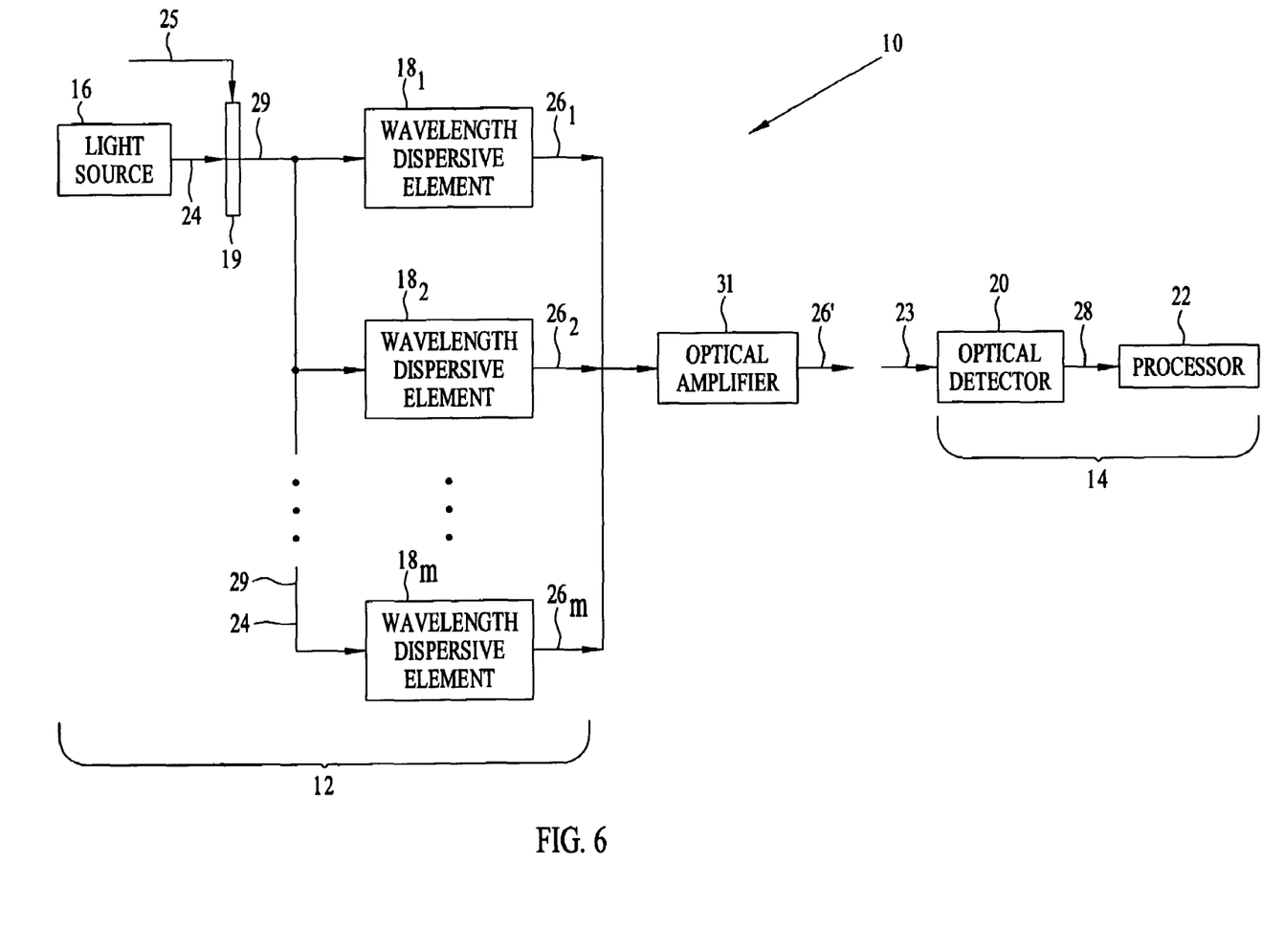
FIG. 6 shows an embodiment of a cryptographic system that includes multiple wavelength dispersive elements having outputs that are amplified by a single optical amplifier.

An embodiment of a cryptographic system 10' wherein optical encoder system 12 includes multiple wavelength dispersive elements $18_1$, $18_2$, ... $18_m$ that operate in parallel is shown in FIG. 5, where m is a positive integer. Each of wavelength dispersive elements $18_1$, $18_2$, ... $18_m$ generates a corresponding unique spectral encoded light signal $26_1$, $26_2$, ... $26_m$, respectively, that is intended to be detected by optical detector 20. Spectral encoded light signals $26_1$, $26_2$, ... $26_m$ may collectively be referenced herein as "spectral encoded light signal 26." Each of spectral encoded light signals $26_1$, $26_2$, ... $26_m$ is characterized by a unique set of intensity and wavelength characteristics. The use of multiple wavelength dispersive elements in cryptographic system 10' makes the decoding and generation of non-valid optical signals more difficult than would be the case with fewer numbers of optical dispersive elements. As shown by way of example in FIG. 5, cryptographic system 10' includes more than two wavelength dispersive elements $18_i$, where i is a positive integer. However, it is to be understood that system 10' may include any positive integral number of wavelength dispersive elements $18_i$, depending upon the requirements of a particular application. Moreover, spectral encoded light signals $26_1$, $26_2$, ... $26_m$, collectively may each be amplified by a single optical amplifier 31 as shown in FIG. 6. Optical amplifier 31 generates an amplified spectral encoded light signal 26' in response to receiving spectral encoded signals $26_1$, $26_2$, ... $26_m$. Optical detector 20 preferably is positioned to receive and detect amplified spectral encoded signal 26'. In response to detecting an optical signal 23, optical detector 20 generates an information output signal 28. If the differences between the spectral and intensity characteristics of optical signal 23 as represented by information output signal 28 and representations of the spectral and intensity characteristics of spectral encoded optical signal 26' are within predetermined limits, then processor 22 categorizes optical signal 23 as valid, whereupon information signal 28 may be subject to further processing. If such differences between optical signals 23 and 26 are not within such predetermined limits, then processor 22 will categorize information signal 23 as not valid.

Figure 7:
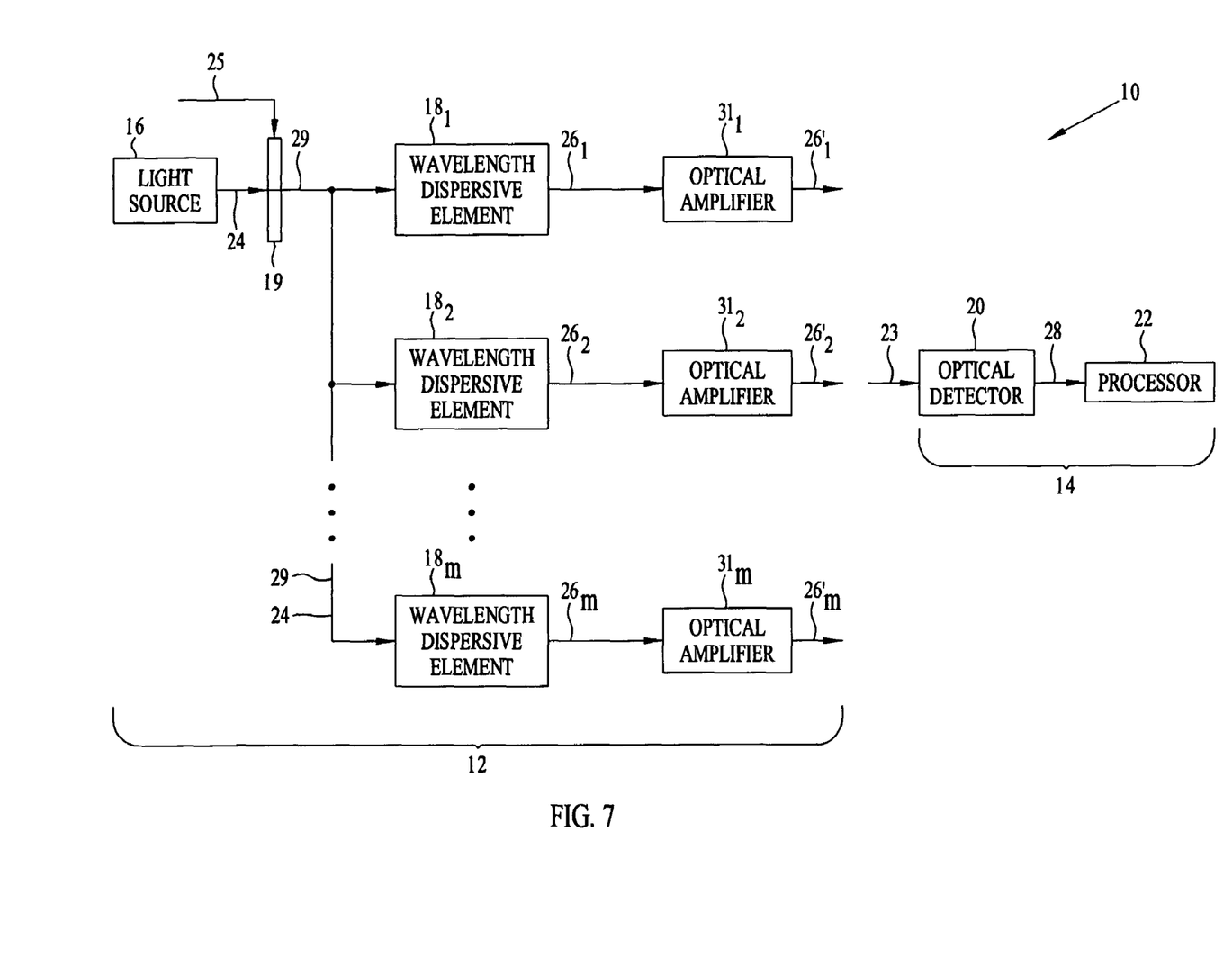
FIG. 7 shows an embodiment of a cryptographic system that includes multiple wavelength dispersive elements having outputs that each are amplified by an optical amplifier.

In another embodiment of cryptographic system 10 as shown in FIG. 7, each of spectral encoded light signals $26_1$, $26_2$, ... $26_m$ may be separately amplified by a corresponding optical amplifier $31_1$, $31_2$, ... $31_m$, respectively. Each of optical amplifiers $31_1$, $31_2$, ... $31_m$ generates a corresponding, amplified spectral encoded light signal $26'_1$, $26'_2$, ... $26'_m$, respectively, which preferably are intended to be detected by optical detector 20. In response to detecting an optical signal 23, optical detector 20 generates an information output signal 28. If the differences between the spectral and intensity characteristics of optical signal 23, as represented by information output signal 28, and representations of the spectral and intensity characteristics of spectral encoded optical signals $26_1$, $26_2$, ... $26_m$ are within predetermined limits, then processor 22 categorizes optical signal 23 as valid, whereupon information signal 28 may be subject to further processing. If such differences are not within such predetermined limits, then processor 22 will categorize information signal 23 as not valid.

Another embodiment provides a method for encrypting and decrypting information. The method comprising the steps of: a) generating an excitation light signal; b) encoding the excitation light signal with data to create an encoded light signal; c) transforming the encoded light signal into a spectral encoded light signal characterized by relative peak intensities at specific wavelengths; d) generating an information output signal in response to receiving an optical input signal, wherein the information output signal represents spectral and intensity characteristics of the optical input signal; and e) validating the information output signal if differences between representations of the optical input signal, and representations of the spectral encoded light signal are within predetermined limits. The information output signal represents the spectral and intensity characteristics of the optical input signal.

Figure 9:
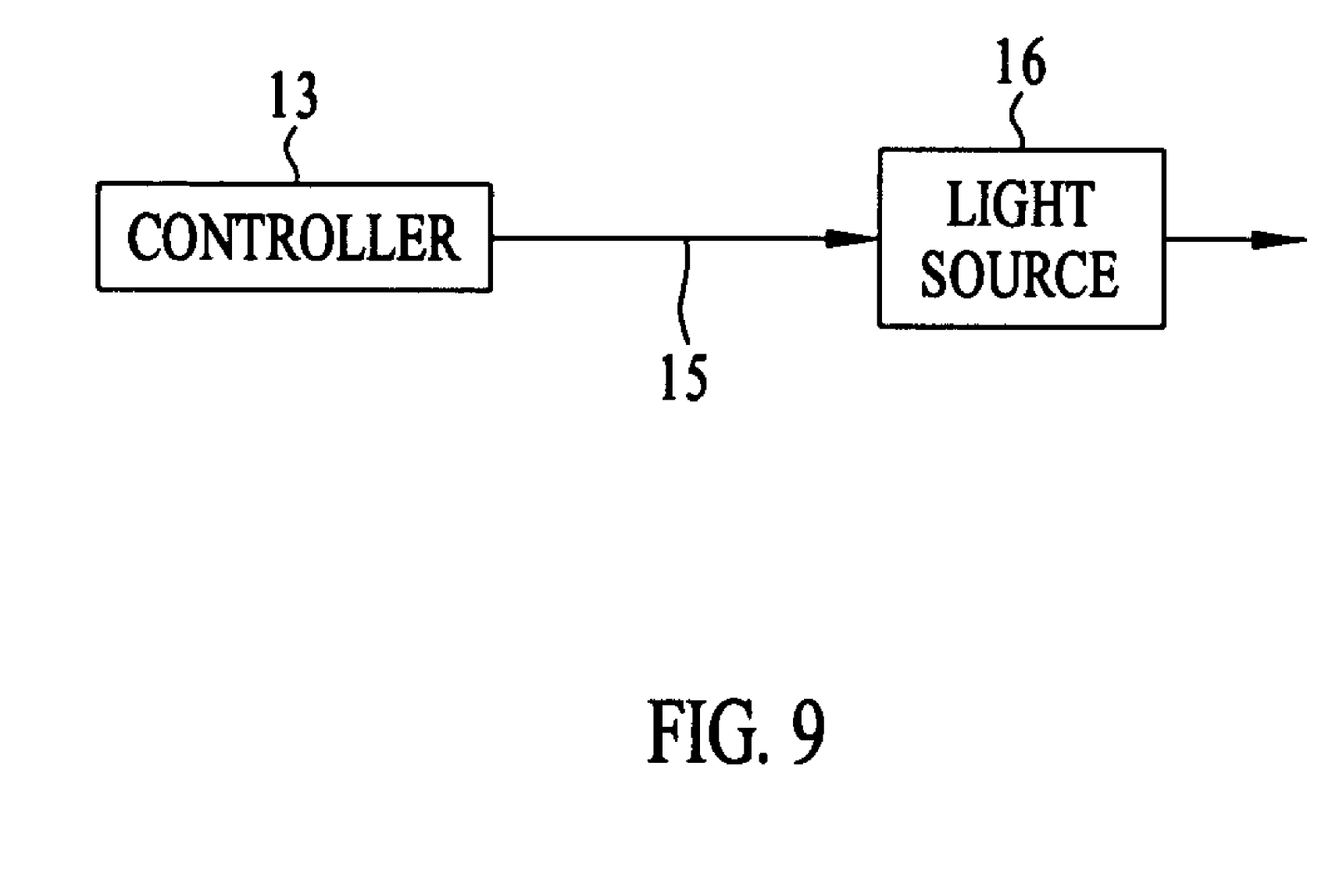
FIG. 9 shows an embodiment of a cryptographic system that includes a controller for modulating the output of the excitation light source to encode data therein.

Obviously, many modifications and variations of the present invention are possible in light of the above teachings. For example, in another embodiment, shown in FIG. 9, controller 11 may be employed for controlling the voltage provided to light source 16 and thereby modulate excitation light signal 24 to encode data therein and thereby create encoded light signal 29. It is therefore to be understood that within the scope of the appended claims, the invention may be practiced otherwise than as specifically described.

We claim:

1. A cryptographic system, comprising:
 a light source for generating an excitation light signal;
 a spatial light modulator for encoding said excitation light signal with data;
 a wavelength dispersive element for transforming said excitation light signal into a spectral encoded light signal characterized by relative peak intensities at specific wavelengths;
 an optical detector for generating an information output signal in response to receiving an optical input signal, wherein said information output signal represents spectral and intensity characteristics of said optical input signal; and
 a processor for validating said information output signal if differences between representations of said optical input signal and representations of said spectral encoded light signal are within predetermined limits.

2. The cryptographic system of claim 1 wherein said information output signal represents said spectral and intensity characteristics of said optical input signal.

3. The cryptographic system of claim 1 wherein said wavelength dispersive element consists essentially of a material selected from the group that includes a semiconductor, electrical insulator, and metal.

4. The cryptographic system of claim 1 wherein said wavelength dispersive element is selected from the group that includes a mono-crystalline solid, poly-crystalline solid, amorphous solid, liquid, and gas.

5. The cryptographic system of claim 4 wherein said mono-crystalline material is selected from the group that includes AlGaAs, SiGe, potassium chromate, antimony trioxide, strontiumchromogallate, and molybdenum.

6. The cryptographic system of claim 1 further including a polarizer for imbuing said spectral encoded light signal with polarization characteristics.

7. The cryptographic system of claim 1 further including an optical amplifier for amplifying said spectral encoded light signal.

8. A cryptographic system, comprising:
 a light source for generating an excitation light signal;
 a spatial light modulator for encoding said excitation light signal with data to create a spectral encoded light signal;
 multiple wavelength dispersive elements, wherein each of said wavelength dispersive elements transforms a portion of said spectral encoded light signal into a unique spectral encoded light signal characterized by relative peak intensities at specific wavelengths;
 an optical detector for generating an information output signal in response to receiving an optical input signal, wherein said information output signal represents spectral and intensity characteristics of said optical input signal; and
 a processor for validating said information output signal if differences between representations of said optical input signal, and representations of each said spectral encoded light signal are within predetermined limits.

9. The cryptographic system of claim 8 wherein said information output signal represents said spectral and intensity characteristics of said optical input signal.

10. The cryptographic system of claim 8 wherein each of said wavelength dispersive elements is a crystal.

11. The cryptographic system of claim 10 wherein each of said wavelength dispersive elements consists essentially of a material selected from the group that includes a semiconductor, insulator, and metal.

12. The cryptographic system of claim 8 wherein each of said wavelength dispersive elements consists essentially of a material selected from the group that includes a mono-crystalline solid, poly-crystalline solid, amorphous solid, liquid, and gas.

13. The cryptographic system of claim 8 wherein each of said wavelength dispersive elements consists essentially of a material selected from the group that includes AlGaAs, SiGe, potassium chromate, antimony trioxide, strontiumchromogallate and molybdenum.

14. The cryptographic system of claim 10 further including a polarizer for imbuing said spectral encoded light signal with polarization characteristics.

15. The cryptographic system of claim 8 further including an optical amplifier for amplifying said spectral encoded light signal.

16. A method for encrypting and decrypting information, comprising the steps of:
 generating an excitation light signal;
 encoding said excitation light signal to create an encoded light signal;
 transforming said encoded light signal into a spectral encoded light signal characterized by relative peak intensities at specific wavelengths;
 generating an information output signal in response to receiving an optical input signal, wherein said information output signal represents spectral and intensity characteristics of said optical input signal; and
 validating said information output signal if differences between representations of said optical input signal, and representations of said spectral encoded light signal are within predetermined limits.

17. The method of claim 16 wherein said information output signal represents said spectral and intensity characteristics of said optical input signal.

18. The method of claim 16 further including the step of imbuing said spectral encoded light signal with polarization characteristics.

19. An optical encoder system comprising:
 a light source for generating an excitation light signal;
 a spatial light modulator disposed relative to said light source for receiving said excitation light signal and encoding said excitation light signal with data; and
 a wavelength dispersive element disposed relative to said spatial light modulator for receiving the data encoded excitation light signal, said wavelength dispersive element comprising a material that, when interacting with said data encoded excitation light signal, imposes specific spectral characteristics on said data encoded excitation light signal
 whereby, the optical encoder transforms said data encoded excitation light signal into a spectral encoded light signal characterized by relative peak intensities at specific wavelengths.

20. An optical detector comprising:
 a detector for generating an information output signal in response to receiving an optical input signal, wherein said information output signal represents spectral and intensity characteristics of said optical input signal; and
a processor for validating said information output signal if differences between representations of said optical input signal and representations of said spectral encoded light signal are within predetermined limits.

* * * * *